(12) United States Patent
Moriggi (10) Patent No.: US 7,270,374 B2
(45) Date of Patent: Sep. 18, 2007

(54) STRUCTURE FOR ANATOMICAL SUPPORT WITH FRAME AND CONVEX CUSHIONED PLATE FOR BACK, HEADREST AND SEAT, FOR SEATING IN GENERAL, ESPECIALLY SEATS IN MOTOR VEHICLES, WITH MANUAL AND MOTOR-DRIVEN ADAPTION OF CUSHIONED PLATE COVEXITY AND POSITION

(75) Inventor: Attilio Luigi Moriggi, Vailate (IT)

(73) Assignee: Resal SRL, Vailate (Cremona) (IT)

( * ) Notice: Subject to any disclaimer, the term of this patent is extended or adjusted under 35 U.S.C. 154(b) by 203 days.

(21) Appl. No.: 10/542,826

(22) PCT Filed: Apr. 3, 2003

(86) PCT No.: PCT/IT03/00201

§ 371 (c)(1),
(2), (4) Date: Jul. 20, 2005

(87) PCT Pub. No.: WO2004/080243

PCT Pub. Date: Sep. 23, 2004

(65) Prior Publication Data

US 2006/0131938 A1   Jun. 22, 2006

(30) Foreign Application Priority Data

Mar. 11, 2003  (IT) .......................... MI2003A0446

(51) Int. Cl.
*A47C 7/46* (2006.01)
*A47C 3/025* (2006.01)

(52) U.S. Cl. .................................. 297/284.4; 297/284.7

(58) Field of Classification Search ............. 297/284.4, 297/284.7
See application file for complete search history.

(56) References Cited

U.S. PATENT DOCUMENTS

| | | | | |
|---|---|---|---|---|
| 5,050,930 A | * | 9/1991 | Schuster et al. | 297/284.4 |
| 5,197,780 A | | 3/1993 | Coughlin | 297/284.7 |
| 5,217,278 A | * | 6/1993 | Harrison et al. | 297/284.7 |
| 5,449,219 A | * | 9/1995 | Hay et al. | 297/284.4 |
| 5,474,358 A | * | 12/1995 | Maeyaert | 297/284.7 |
| 5,567,011 A | | 10/1996 | Sessini | 297/284.7 |
| 5,609,394 A | * | 3/1997 | Ligon et al. | 297/284.4 |
| 5,704,687 A | * | 1/1998 | Klingler | 297/284.4 |
| 6,050,641 A | * | 4/2000 | Benson | 297/284.4 |

(Continued)

FOREIGN PATENT DOCUMENTS

CA   2 313 719 A   1/2002

*Primary Examiner*—Rodney B. White
(74) *Attorney, Agent, or Firm*—Michael J. Striker (57) ABSTRACT

Structure for anatomical support for the back, headrest and seat components of chairs in general and especially seats in motor vehicles comprising a frame, a convex cushioned plate fitted with sliding means in relation to the frame and pull-push cables, the first end of which is fixed to one or other end of the cushioned plate, freely sliding inside a sheath whose first end is fixed, on the frame, to one or other of the ends of the cushioned plate, while the second end of said push-pull cable and of said sheath is fixed to control devices for adjusting the position of the cushioned plate if the first end of the sheath is fixed to the frame, or for adjusting convexity of the cushioned plate if the first end of the sheath is fixed to said plate.

14 Claims, 11 Drawing Sheets

U.S. PATENT DOCUMENTS

| | | | |
|---|---|---|---|
| 6,053,064 A | 4/2000 | Gowing et al. | 297/284.7 X |
| 6,079,783 A * | 6/2000 | Schuster et al. | 297/284.4 |
| 6,139,102 A * | 10/2000 | von Moller | 297/284.4 |
| 6,158,300 A * | 12/2000 | Klingler | 297/284.4 X |
| 6,227,618 B1 * | 5/2001 | Ligon et al. | 297/284.4 |
| 6,338,530 B1 * | 1/2002 | Gowing | 297/284.4 |
| 6,357,826 B1 * | 3/2002 | Gabas et al. | 297/284.4 |
| 6,631,951 B2 * | 10/2003 | Blendea et al. | 297/284.4 |
| 6,652,028 B2 * | 11/2003 | McMillen | 297/284.4 |
| 6,682,144 B2 * | 1/2004 | Klingler | 297/284.4 |
| 6,779,844 B2 * | 8/2004 | Dosen et al. | 297/284.4 |
| 6,908,153 B2 * | 6/2005 | Blendea | 297/284.4 |
| 7,000,986 B2 * | 2/2006 | Cruz Fernandes de Pinho et al. | 297/284.4 |
| 7,083,232 B2 * | 8/2006 | Frank | 297/284.4 |

\* cited by examiner

STRUCTURE FOR ANATOMICAL SUPPORT WITH FRAME AND CONVEX CUSHIONED PLATE FOR BACK, HEADREST AND SEAT, FOR SEATING IN GENERAL, ESPECIALLY SEATS IN MOTOR VEHICLES, WITH MANUAL AND MOTOR-DRIVEN ADAPTION OF CUSHIONED PLATE COVEXITY AND POSITION

The invention concerns cushioned plates shaped for the back, headrest and seat for seating in general, especially in motor vehicles.

Wide use is made of cushioning inside seat backs, especially in the backs of car seats, where its position can be varied longitudinally, as can also convexity of the support, to suit the user's preference.

The devices required to provide these variations are generally complex and costly, and somewhat awkward to manage by the user.

The above invention enables the position of the cushioned plate, and its convexity, in the seat back as well as in the headrest and on the seat, to be varied with the greatest ease by means of simple electrical controls, as will now be explained.

Subject of the invention is a structure for anatomical support in the back, headrest and seat components of seating in general especially in motor vehicles.

The structure comprises a convex cushioned plate fitted with means for sliding it in relation to the frame, and push-pull cables the first end of which is fixed to one or other end of the cushioned plate, freely sliding in a sheath the first end of which is fixed to the frame or to one or other end of the cushioned plate.

The second end of said push-pull cable and of said sheath is fixed to operating devices mounted on the fixed structures of said components of the seat.

By moving the push-pull cable in both directions, said devices adjust the position of the cushioned plate if the first end of the sheath is fixed to the frame, or convexity of said cushioned plate if the first end of the sheath is fixed to said plate.

The two ends of the sheath are respectively fixed to the cushioned plate, to the frame and to the control devices by an anchoring means comprising a tubular body with partially elastic ends which permit forced insertion of the end of the sheath, and a safety ring movable from an idle position to the area of the tubular body in which the end of the sheath has been pressed to stabilize it.

Movement in both directions of the push-pull cable inside the sheath is obtained by a cylindrical slider, having two diametral arms at its top and, at its base, a means for holding the end of the push-pull cable, freely sliding within a tubular body that presents two longitudinal slits in which said diametral arms freely move.

Said tubular body fits inside a sleeve in whose inner wall are helical grooves the dimensions of which permit a freely sliding movement of the ends of said diametral arms, projecting through the slits.

In the bottom of said grooved sleeve is a device for holding the sheath. The end of the push-pull cable emerging from said sheath is fixed to the slider.

It follows that, by using the control devices to make said tubular body rotate, the slider with its arms is forced, by the simultaneous effect of the longitudinal slits in the tubular body and by the helical grooves in the sleeve, to translate in relation to the sheath, in one direction or in the other according to the direction of rotation impressed upon it by the tubular body, thus adjusting the position of the cushioned plate, or its convexity, in relation to the frame.

When the tubular body has terminated rotation in one direction or the other, the ends of the slider's arms enter in one or other of the pairs of transversal grooves at the two ends of the longitudinal slits, so stabilizing the adjusted position or convexity of the cushioned plate determined by said rotation of the tubular body.

In the control devices, rotation of the tubular body in either direction is done either manually by means of a knob, or by an electrically driven ratiomotor connected to a switch respectively at the sides of the seat back, of the headrest and of the actual seat itself.

Placed at the sides of the seating components, namely of the back, headrest and seat, are two control devices for respectively adjusting the position or convexity of the cushioned plate, one device for each component.

In one type of execution the first end of the sheath is fixed to one end of the frame and a first end of the push-pull cable to one end of the cushioned plate so that, having determined translation, by means of the control devices to which the second ends of the push-pull cable and of the sheath are fixed, and of said cable in relation to the sheath, the cushioned plate can be adjusted in relation to the frame.

In one execution the frame and cushioned plate are made in a single piece.

The two components are associated by a hinge of the same material but thinner, allowing the cushioned plate to be bent over onto the frame.

At the end of the frame opposite to the hinge, rods, present at the free end of said cushioned plate, can be inserted and slide freely in two lateral slots.

A first end of the sheath is fixed to the frame while the first end of the push-pull cable is fixed to the free end of the cushioned plate.

In this way, having determined, by means of the control devices to which the second ends of the push-pull cable and sheath are fixed, translation of said cable in relation to the sheath, it becomes possible to adjust convexity of the cushioned cable.

A manual multiple control device comprises insertion, around the grooved sleeve that carries the knob, of a rotating sleeve to which is fixed a triangular lever, having an end sufficiently projecting in relation to the knob, and comprising a rotatable finger knob.

A device for anchoring a sheath is attached to a longitudinal tab fixed to said grooved sleeve.

On said rotating sleeve is another longitudinal tab fixed to which is the head of one end of the push-pull cable, sliding inside said sheath.

By rotating the knob it is therefore possible to move the push-pull cable in both directions inside a sheath inserted in the anchoring device at the base of the grooved sleeve and, using the knob for shifting the triangular lever, move the push-pull cable sliding inside a sheath inserted in the anchoring device fixed to the tab attached to the grooved sleeve.

From the foregoing it is clear that, using the control knob, convexity of the cushioned plate can be adjusted in relation to the frame, while the same may be done to its position using the knurled finger knob.

In one type of execution the frames are joined to the fixed structure of the seat by helical springs.

In one type of execution the fixed structure is created, both in the back and seat components, by a transversal metal band shaped to extend substantially all round the perimeter of these components.

In one type of execution the ratiomotor for the electric motor is epicycloidal.

The invention offers evident advantages.

Simple and convenient means are employed to adjust the cushioned plate in the back, headrest and seat, of chairs in general but especially in the seats of motor vehicles.

The position of controls at the sides for adjusting lengthwise position of the cushioned plate and convexity in the back, headrest and seat facilitates such adjustments especially when the vehicle is moving.

In the execution with an electric motor, the user simply uses the switches placed in convenient positions respectively for the back, the headrest and the seat.

The execution presenting the multiple knob and lever control respectively for adjusting the position and convexity of a cushioned plate, is both inexpensive and convenient to operate.

The execution in which the frame and the cushioned plate come in a single piece is less costly both as regards components and assembly. To sum up these advantages, the various executions described enable the user to achieve a high degree of comfort by application of cushioned plates, both in ordinary seating as well as that in a motor vehicle, ensuring a restful position, especially during a long journey and even in stressful traffic conditions.

The simplicity, economy and comfort provided for users can make possible a universal application of an invention so especially suited to motor vehicles.

Characteristics and purposes of the disclosure will be made still clearer by the following examples of its execution illustrated by diagrammatically drawn figures.

Plate 1/11, FIG. 1 The back of a car seat with built-in headrest, illustrating the cushioned plate operated, using a push-pull cable sliding in a sheath and transmission, by a control device with knob and assembly, shown at minimum level and at minimum convexity, perspective with graphic break and detail of the transmission.

Plate 2/11, FIG. 2 Means of control with knob, assembly comprising a slider with arms and a grooved sleeve and with the ends of the push-pull cable and sheath, at the first terminal position of the slider, perspective with graphic break.

Plate 2/11, FIG. 3 The control device in FIG. 2, exploded view.

Plate 3/11, FIG. 4 As in FIG. 3 with the push-pull cable fixed in the slider with arms fitted into the assembly and with the sheath inserted in the base of the grooved sleeve.

Plate 3/11, FIG. 5 The control device at the second terminal position of the slider, perspective.

Plate 4/11, FIG. 6 Seat back with cushioned plate set higher up, perpsective view, cut away.

Plate 5/11, FIG. 7 Back with cushioned plate given greater convexity, perspective view, cut away.

Plate 6/11, FIG. 8 Seat in a motor vehicle with headrest built into the back, and separate view of the seat, perspective view cut away.

Plate 7/11, FIG. 9 Seat as above with motor driven control devices, perspective view, cut away.

FIG. 10 Motor driven control device, perspective.

FIG. 11 Electrical connections for motor driven device.

Plate 8/11, FIG. 12 Execution of frame in a single piece with cushioned plate lying flat, view from the front.

FIG. 13 Execution in FIG. 12 with cushioned plate on the frame, front view.

Plate 9/11 FIG. 14 As in FIG. 13, back view.

FIG. 15 As in FIG. 14, lateral section drawn at axis AA.

FIG. 16 As in FIG. 14, partial lateral section at axis BB.

FIG. 17 As in FIG. 15, greater convexity of cushioned plate

Plate 10/11 FIG. 18 Multiple manual device with second control in the first position, perspective.

FIG. 19 As above with second control in second position, perspective.

Plate 11/11 FIG. 20 Seat back served by multiple control, perspective, cut away.

Figure 1:
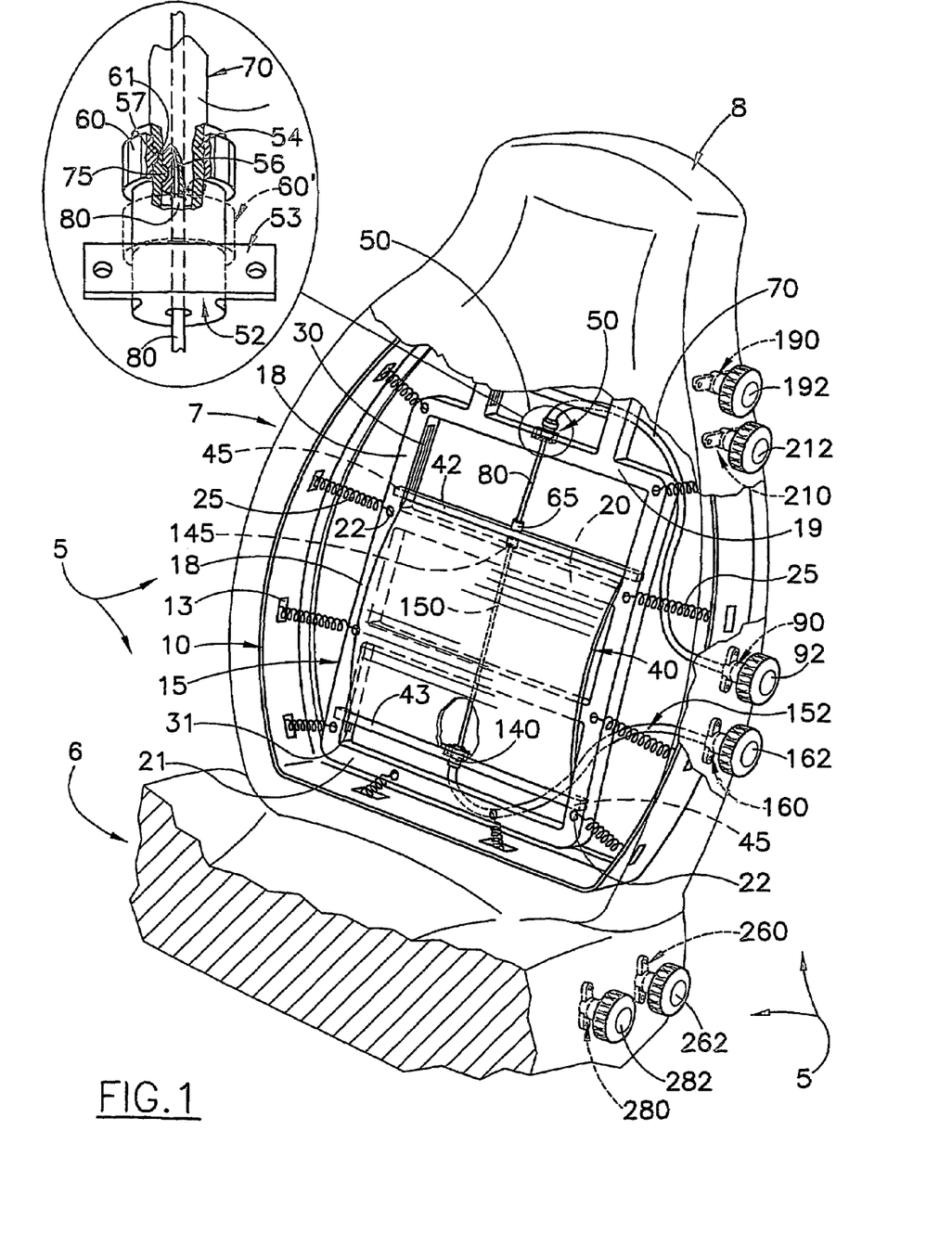

FIG. 1 shows a seat 5 in a motor vehicle comprising the seat component 6, the back 7 and built-in headrest 8.

In the back 7, the metal reinforcement 10 supports the frame 15, with uprights 18 and cross pieces 19,21, by means of a set of helical traction springs 25 fixed at their two ends respectively in the holes 13 in the reinforcement 10 and in the holes 22 in the frame 15.

The elastic rectangular cushioned plate 40, slightly convex lengthwise, is placed between the uprights of the frame 15, said plate being adjustable in position and convexity as required by the seated person. The upper and lower ends of the cushioned plate 40 are kept rigid respectively by bars 42, 43 and by rods 45 at the ends, that freely penetrate in the slots 30, 31 on the inner sides of the frame 15.

The control device 90, with knob 92, is placed at on side of the back 7. By means of the pull-push cable 80 freely sliding in the sheath 70, and through the transmission device 50 (FIG. 1) fixed to the upper cross piece 19 of the frame 15, said knob 92 is used to adjust the position of the cushioned plate.

The control device 90 (FIGS. 2-5) comprises the assembly 91 and control knob 92 with collar 93 and longitudinal diametral ribs 94.

Said collar 93 on the knob penetrates inside the tubular cylindrical body 97 guided by ribs 94 that enter the longitudinal diametral cavities 98 said collar 96 and are stabilized by means not shown for simplicity. The tubular body 97 presents two longitudinal slits 100 and 101 at the ends of which are branches of equal width with cavities 102 and 103 facing opposite ways.

Inserted into said tubular body 97, with a suitable amount of play, is the cylindrical slider 110 at one end of which are the two diametral arms 116 and 117 whose diameter corresponds, with a suitable amount of play, to the width of the longitudinal slits 100, 101 in said tubular body 97.

At the other end of said slider 110 is a chamber 111 with window 112 at the bottom of which is the slit 113 with bevelled corners 115 and cavity 114 bounded by the opposing projections 118.

Inside this cavity the push-pull cable 80 will be inserted by pressure. Close to its base the sleeve 120 presents anchoring tabs 122 and, on its internal walls, a pair of helical grooves 123 and 124, open at the rim of said sleeve 120, of a constant width corresponding to the diameter of the arms 116, 117 of the slider 110.

The internal diameter of said sleeve 120 corresponds, with a suitable amount of play, to the external diameter of the tubular body 97 and, on its internal wall close to the lower end 125, presents a circumferential groove 126 the dimensions of which correspond to those of the projecting rim 106 with a sloping inward-facing wall at the end of said tubular body 97.

Said lower end 125 of the sleeve 120 extends to the cylindrical extension 130 of an internal diameter slightly greater than that of the slider 110, followed by the moderately elastic tubular anchorage 131 for the sheath that presents diametral pairs of internal and external heads, respectively 132 and 133.

The internal diameter of said anchorage 131 corresponds to the external diameter of a sheath 70 at the second end of which are recesses 76.

The safety ring 135, with internal recesses 136, can be placed round said, anchorage 131 for the sheath.

During assembly, the push-pull cable 80 in the sleeve 120 is pressed inside the slit 113 in the base of the slider 110 where pressure, exerted by the sides of the slit and by the head 82 (FIG. 4), holds it in position.

Figure 4:
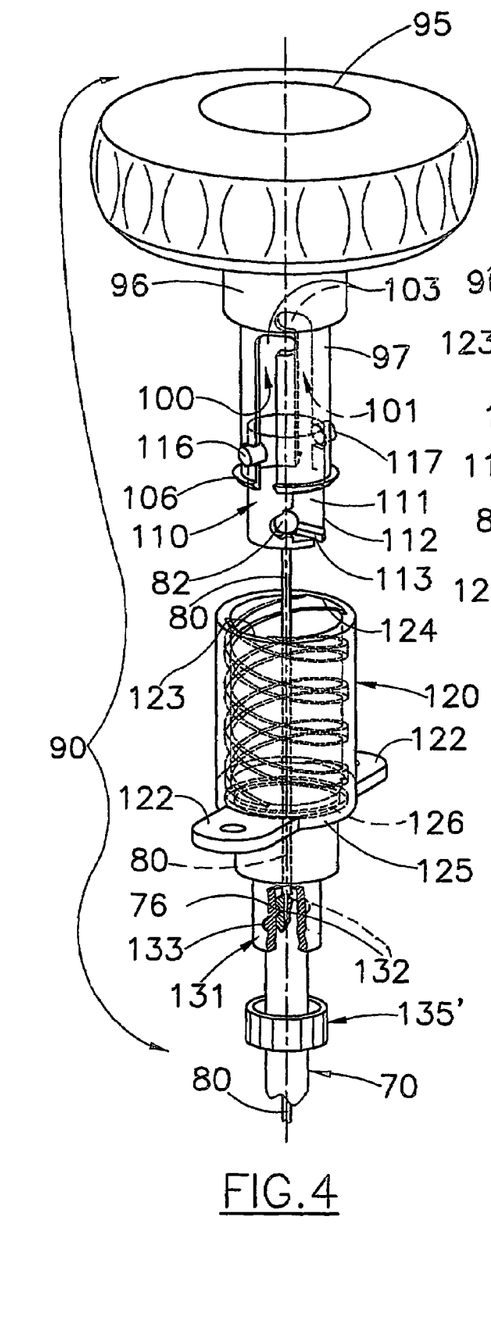
Figure 5:
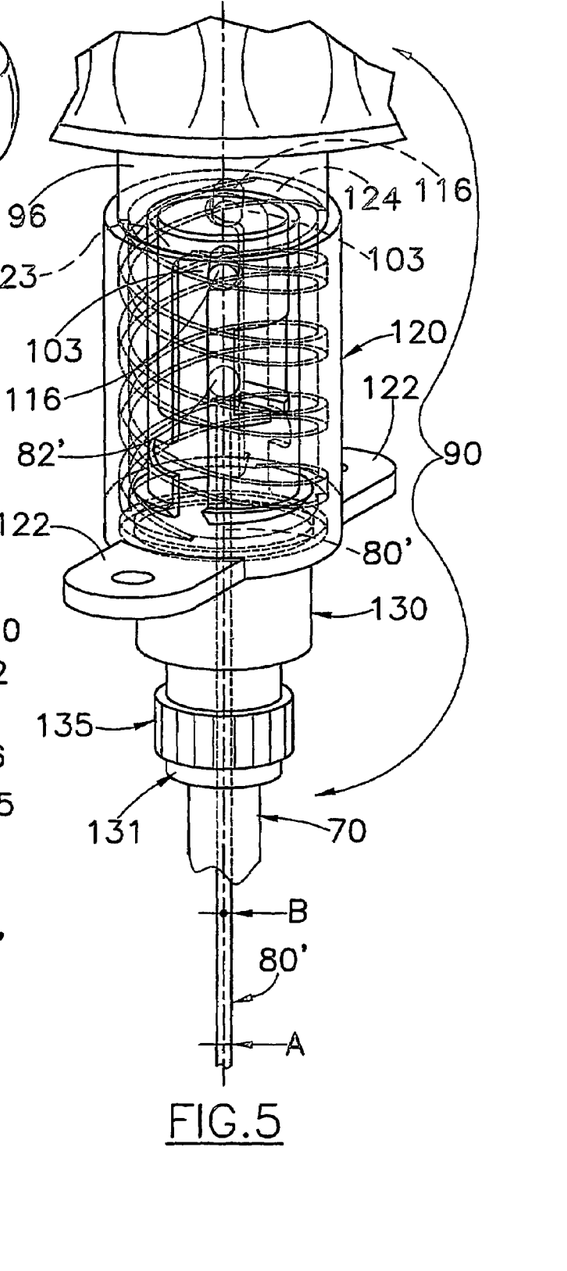

Sheath 70 enclosing said push-pull cable 80 is inserted inside anchoring means 131 and stabilized there by the heads 132 (FIG. 4) that penetrate inside the recesses 76 in said sheath, and by pressure from the safety ring 135 with its internal recesses 136, which ring moves from the idle position 135' to position 135 shown in FIG. 5. Slider 110 is then inserted in the tubular body 97 causing the arms 116, 117 to penetrate inside slits 100 and 101 respectively (FIG. 4). Said tubular body 97 is then inserted into the sleeve 120 so that the ends of arms 116 penetrate into the helical grooves 123 and 124 respectively, as far as insertion of the projecting rim 106 on the tubular body 97 in the circumferential groove 126 (FIG. 5) at the lower end of the sleeve 120 creating the positions as illustrated in FIG. 2.

Figures 2, 3:
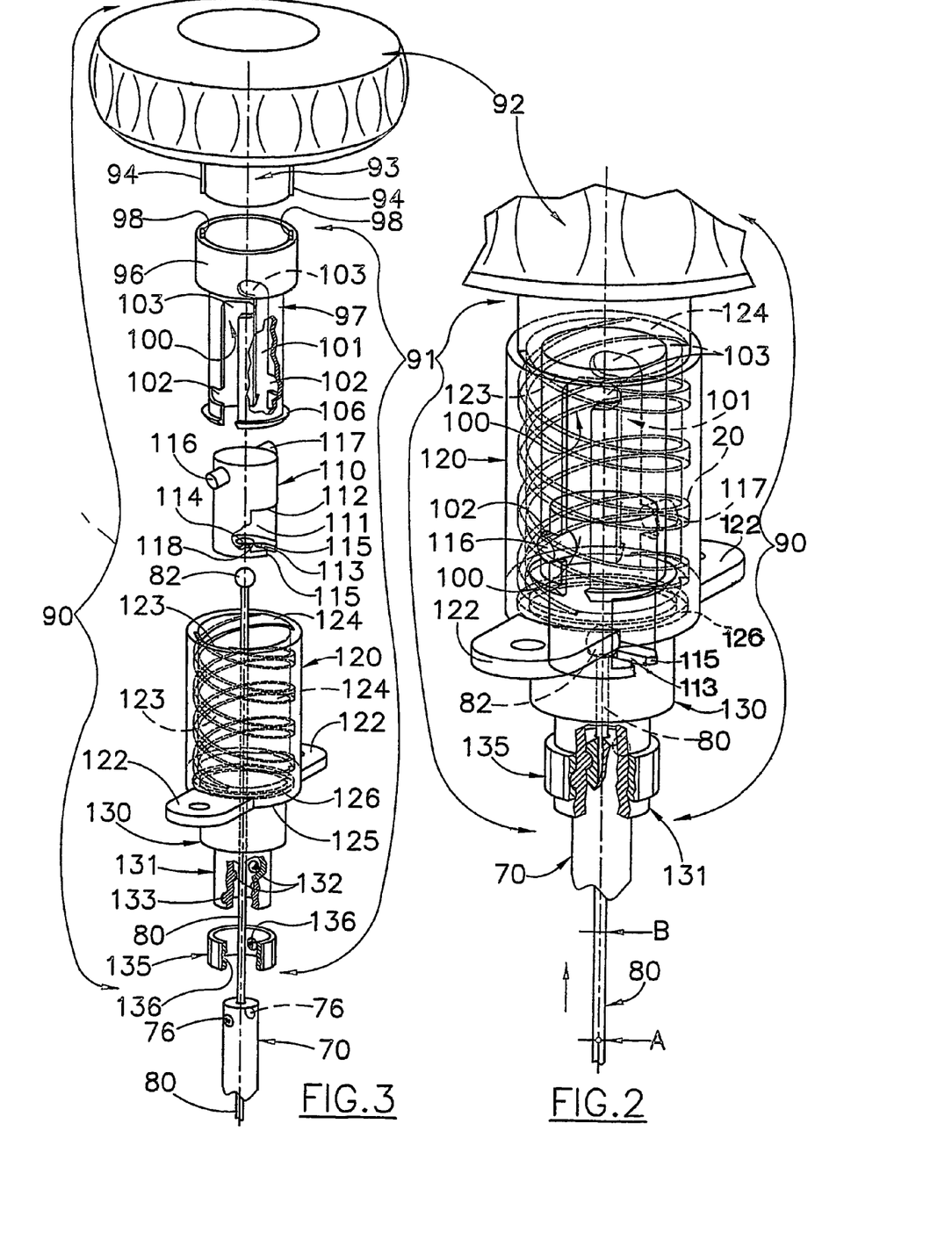

In FIG. 2 the arms 116, 117 of the slider 110 are inside the cavities 102 at the end, here called the bottom, of the slits 100 and 101 and therefore the pull-push cable 80 assumes the position shown at point A in FIG. 2 corresponding to the lower level of the cushioned plate 40 as shown in FIG. 1.

Figure 6:
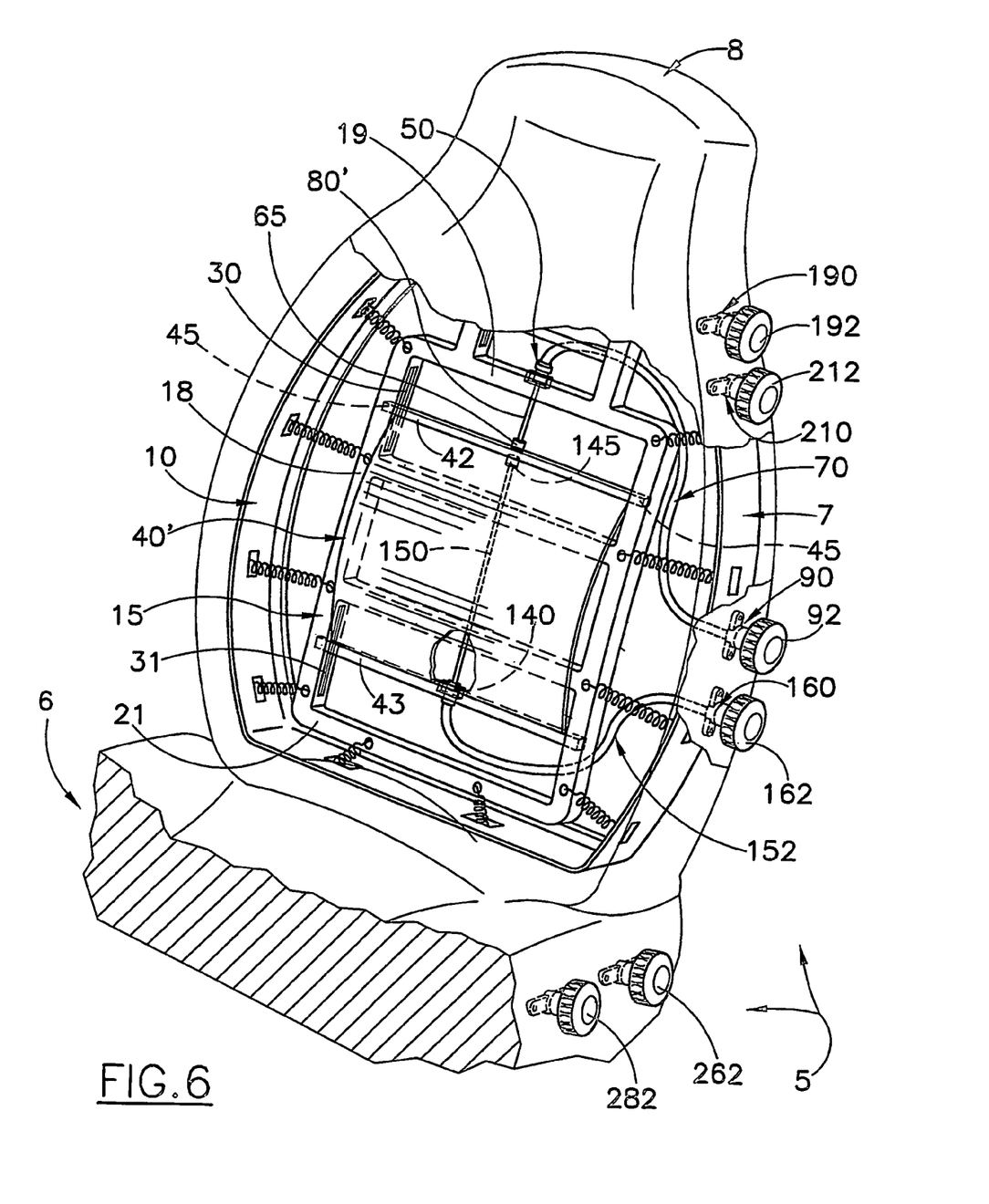
Figure 7:
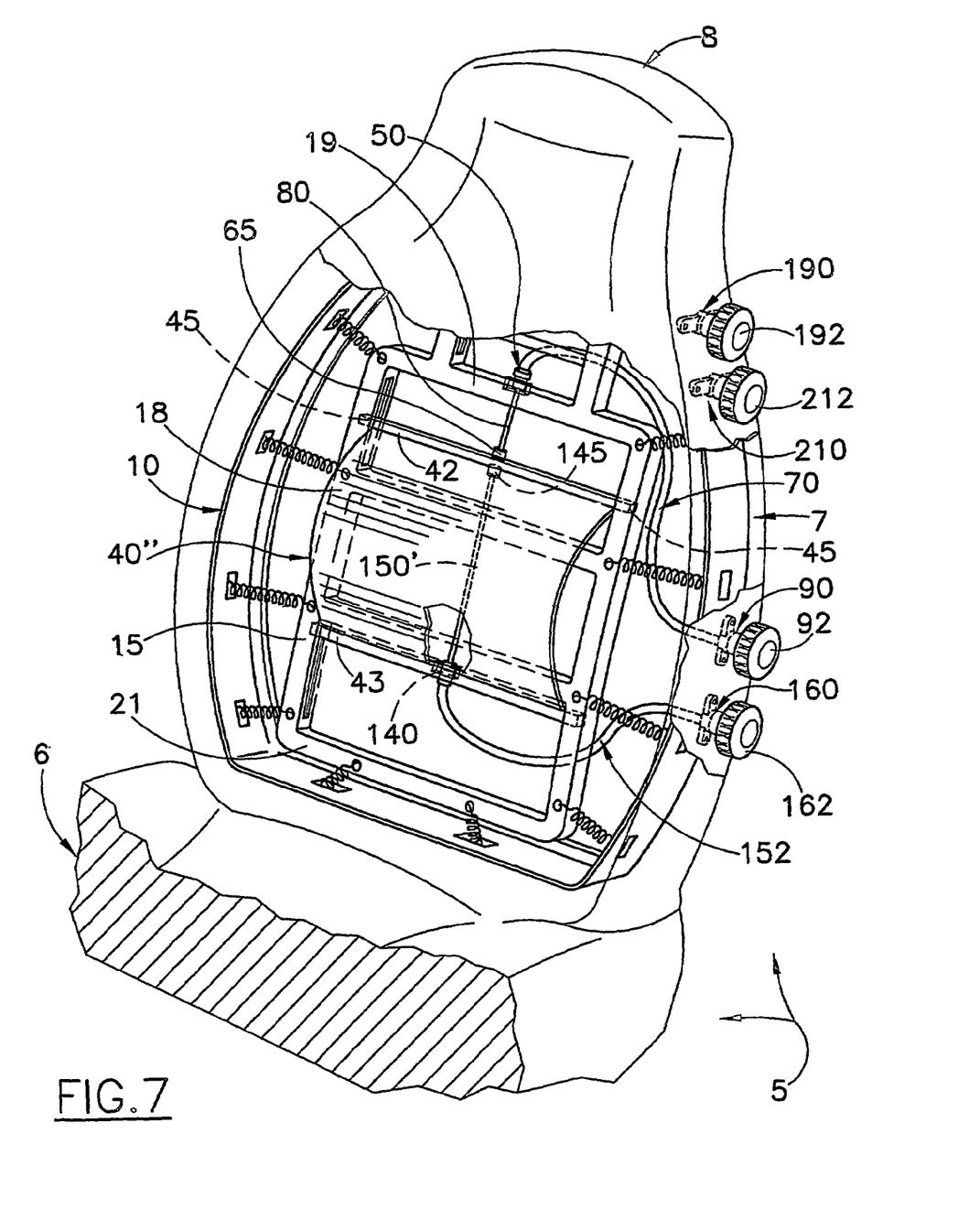

In FIG. 5 rotation of the knob 92 has caused the arms 116, 117 of the slider 110 to emerge from the cavities 102 and, guided by the helical grooves 123 and 124, these have moved to the starting point, here called the top, of the slits 100 and 101 after which translation of the push-pull, cable 80 to the position 80' at point B (FIG. 5) has positioned the cushioned plate 40 as shown in FIG. 6, namely at a short distance from the cross piece 19 (FIG. 6).

Extension 11 of the reinforcement 10 and extension 16 of the frame 15 are shown.

The cushioned plate 170, smaller but substantially the same as the cushioned plate 40 for the back, is guided by pairs of slits 34 and 35 and by short rods 175 at the ends of the bars 171 and 172 which, at the top and bottom respectively, strengthen said cushioned plate 170. Fixed on the upper cross piece 28 of extension 16 of the frame 15 is the transmission device 185 connected to the control device 190, with knob 192, by the push-pull cable 180 with its sheath 182

Said push-pull cable 180 is fixed by the block 187 to the upper bar 171 of the cushioned plate 170.

Also fixed by a block 207 to said bar 171 is the cable push-pull 200 with sheath 202 connected by the transmission device 205 to the means of control 210 with knob 212.

Figure 8:
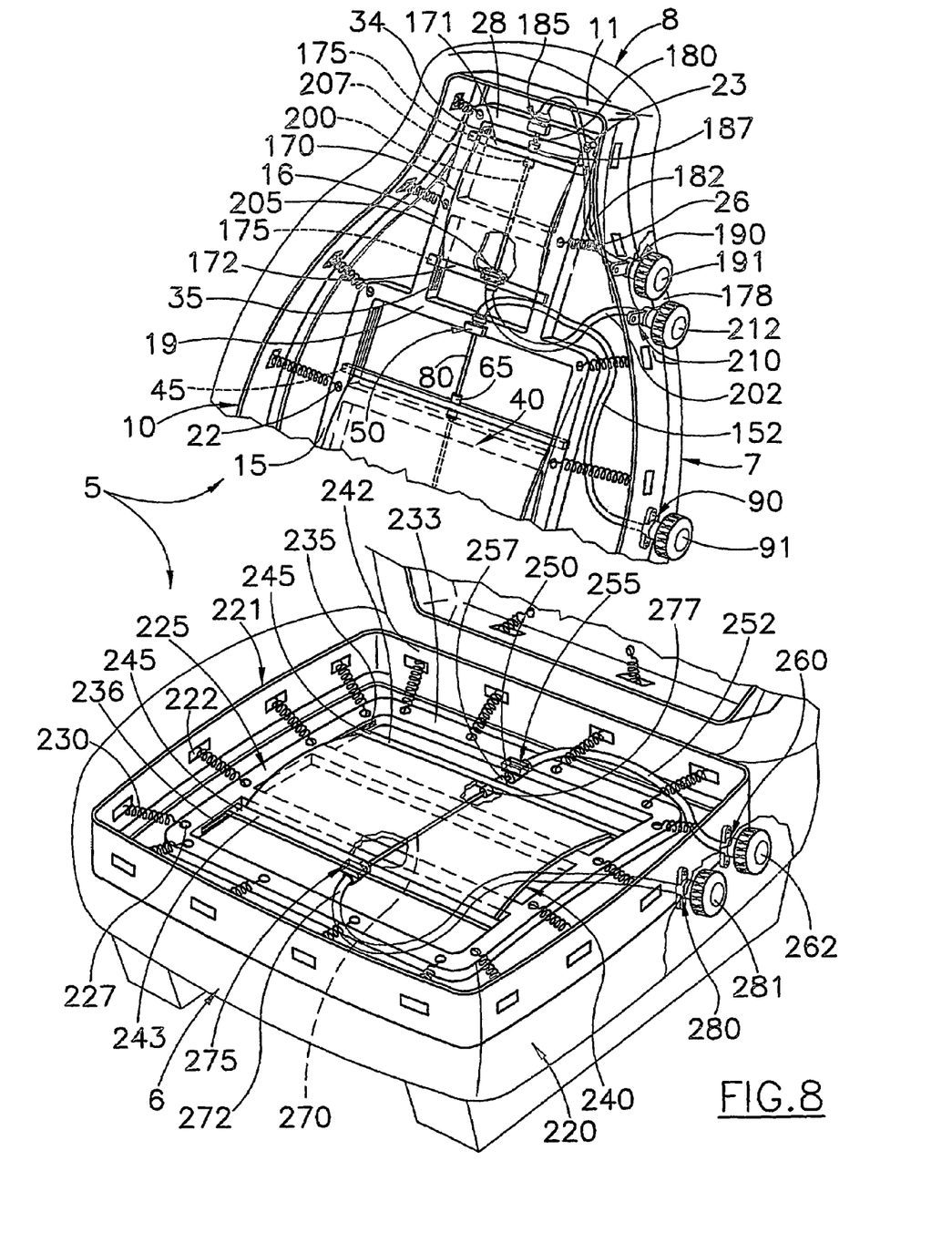

The seat 6 presents the frame 225 supported by reinforcement 221 by means of springs 230 hooked to the holes 227 of the frame and 222 of the reinforcement respectively.

The cushioned plate 230, substantially the same as the cushioned plate 40 for the back but slightly larger, is placed between the uprights of the frame.

The rear and front ends of said cushioned plate 240, are made rigid by the bars 242 and 243 with short rods 245 at their ends, said rods freely penetrating inside the pairs 235, 236 of slits made in the inner sides of the frame 225.

On the side 220 of the seat 6, the control device 260 with knob 262 may be seen applied to the reinforcement 221, for adjusting the position of said cushioned plate 240.

Knob 262 controls the position of the cushioned plate 240 by means of the pull-push cable 250, freely sliding in the sheath 252, and through the transmission device 255 fixed to the rear cross piece 233 of the frame 225.

It will be seen in FIG. 8 that rotation of the knob 262 has set the position of the cushioned plate 240 at a short distance from the rear cross piece 233 of the frame 225.

To adjust convexity of the cushioned plate 240, transmission device 275 is fixed to its front bar 243 and is connected by the push-pull cable 270 with sheath 272 to a second control device 280 with knob 282 mounted on the side 200 of the seat 6.

The transmission devices 255, 275, control devices 260, 280 are substantially identical to the transmission 50 and control devices 90 respectively, and therefore need no specific description.

Figures 9, 10, 11:
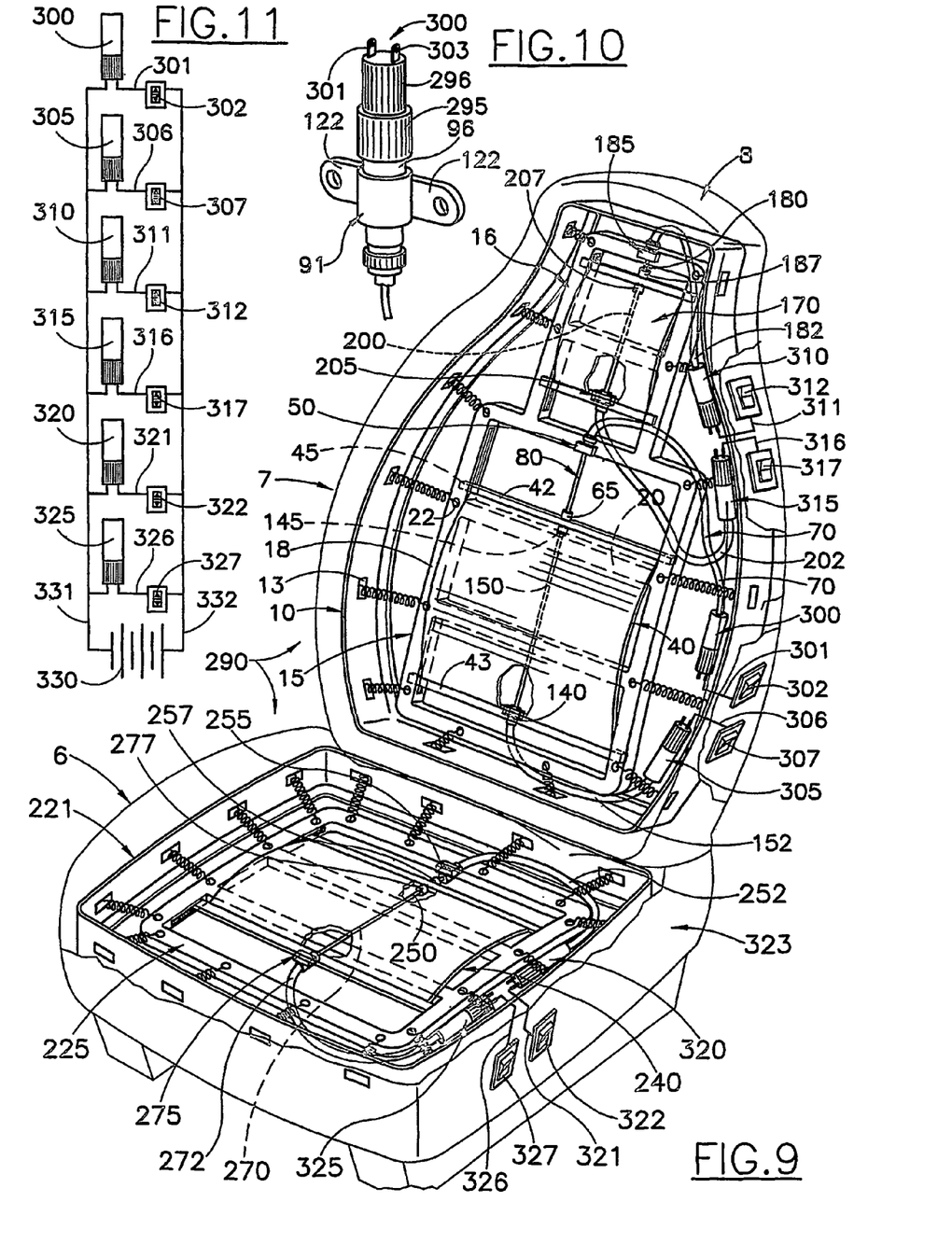

The different numbering serves solely to indicate the changed function. FIG. 9 illustrates the seat 290 in which the control devices, with knobs for adjusting the position and convexity of the cushioned plates 40, 170, 240 respectively of the back 7, headrest 8 and seat 6, are replaced by motor-driven controls.

These devices are obtained by connecting the assembly 91, shown in FIGS. 2-5, to an electric ratiomotor instead of to the knob 92.

FIG. 10 illustrates the device 300 for motor-driven control to adjust the position of the cushioned plate 40 in the back 7.

This device comprises the assembly 91 already described except that it presents the fixing tabs 102 at the side 122 instead of at the bottom. In the cylindrical seat 96 of the tubular body 97 of said assembly 91, the shaft of the ratiomotor 295 has been coupled, connected to the electric motor 296 presenting the electrodes 301 and 303.

The control device so obtained is numbered 300.

To adjust convexity, a device 305 is included connected by the first conductor 306 to the switch 307.

In FIG. 9 the other motor-driven control devices for adjusting position and convexity of the cushioned plate substantially present the same characteristics as those of the device 300 already described.

To adjust its position, the cushioned plate 170 in the headrest 8 is served by the device 310 connected through the first conductor 311 to the switch 312 and, for adjusting convexity, by the device 315 connected through the conductor 316 to the switch 317.

To adjust its position, the cushioned plate 240 in the seat 6 is served by the device 320 connected through the first conductor 321 to the switch 322 and, for adjusting convexity, by the device 325 connected through the conductor 326 to the switch 327.

The second conductor for the motor-driven devices listed above and the second of the related switches, are respectively connected to the two poles of the battery 330 through conductors 331 and 332; these are explained by the diagram in FIG. 11 as it is difficult to include them in graphic form in FIG. 9.

FIGS. 12-17 illustrate a slightly convex cushioned plate 350 formed of a single piece having a frame 351 that can be used, especially for the back of a seat, in motor vehicles.

This product can be pressed in suitable material and therefore inexpensively, and can obviously be made in different sizes, specifically proportioning the different parts, according to the type of seat or chair and according to preferences.

Figures 12, 13:
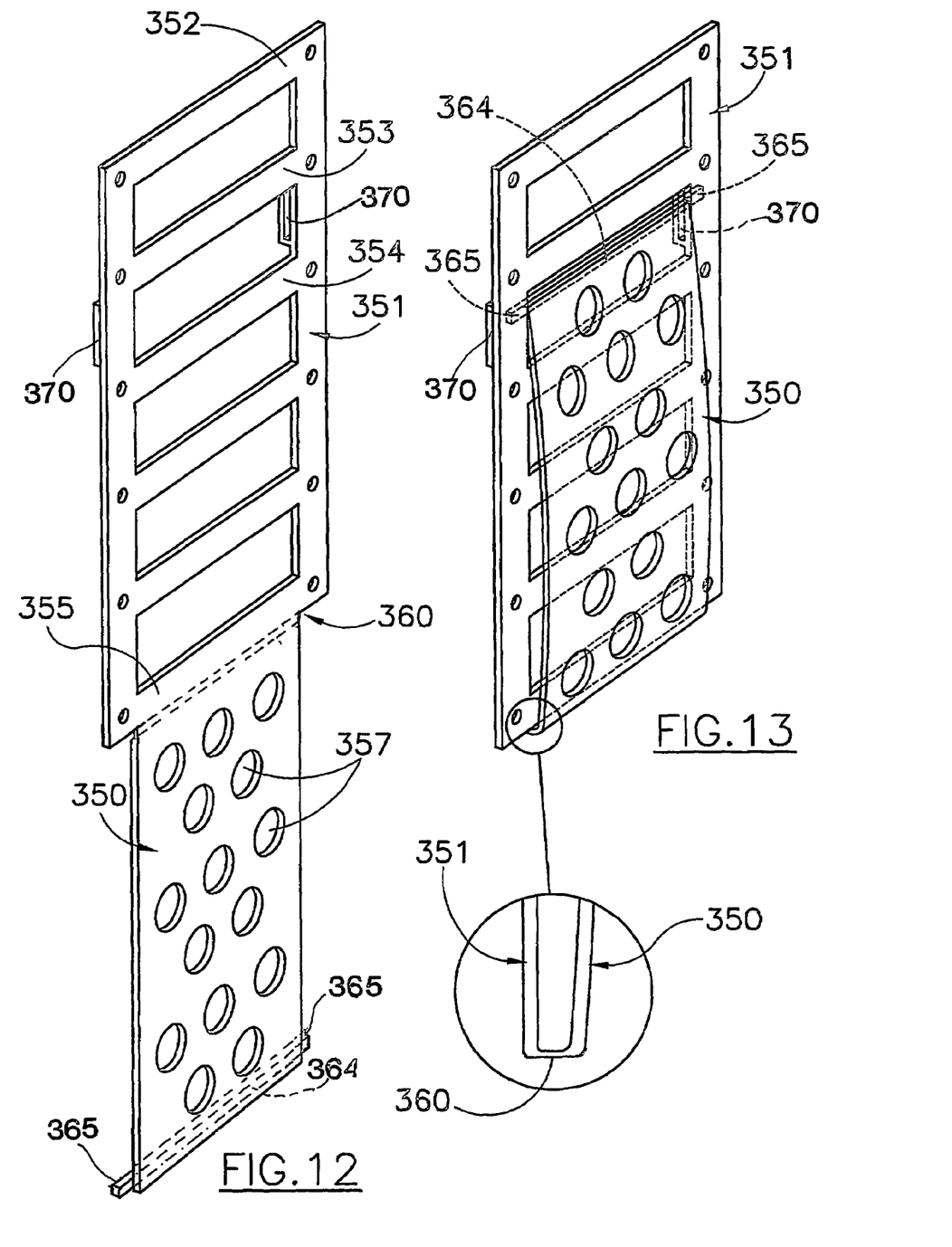

In FIG. 12 the frame 351 presents cross bars 352 at the top, 355 at the bottom, 353 and 354 and others in between.

The cushioned plate 350, with its holes 357, is mounted onto the bottom cross bar 355 by means of the hinge formed of a thin strip 360, shown in detail in the enlarged view, FIG. 13, said strip being thinner than the frame 351.

After pressing, it is therefore a simple matter to bend back said cushioned plate onto the frame as seen in FIG. 13.

Figures 14, 15, 16, 17:
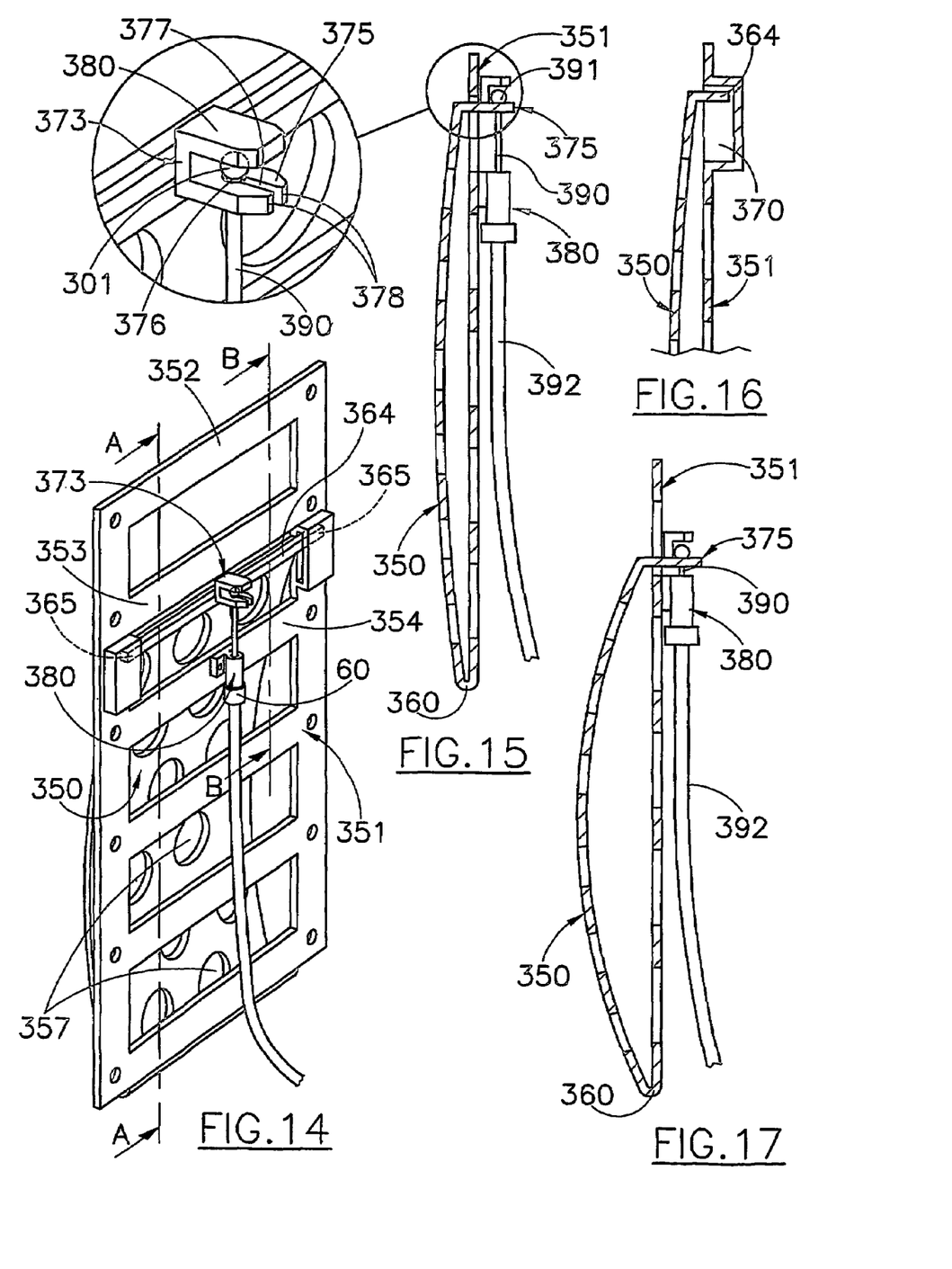

This position is rendered stable by the pair of rods 365 formed at the ends of the reinforcing bar 364 at the top of the cushioned plate 350 (FIG. 14).

Pairs 370 of these rods 365 are fitted into seats close to the cross bar 353 of the frame 351.

In these seats the bars can freely move for their full lengths.

In a tongue-shaped part 375 at the upper end of the cushioned plate is a hole 376 reached through the cut 377 with bevelled ends 378, as seen in the enlargement.

Fitted to the rear of cross bar 354 is a transmission device 380 substantially similar to the transmission device 50 already shown in the detail of FIG. 1 of this description.

By means of this device the head 391 holds the cable 390 and the sheath 392 then made stable by the safety ring.

By connecting the cable-sheath unit to a knob controlled device, such as 90, 190, 260 for manual operation, or to devices 300, 310, 320, already described, for motor-driven control, it is clear that convexity of the cushioned plate 350 can be adjusted as desired, as may be seen in FIG. 17.

Figures 18, 19:
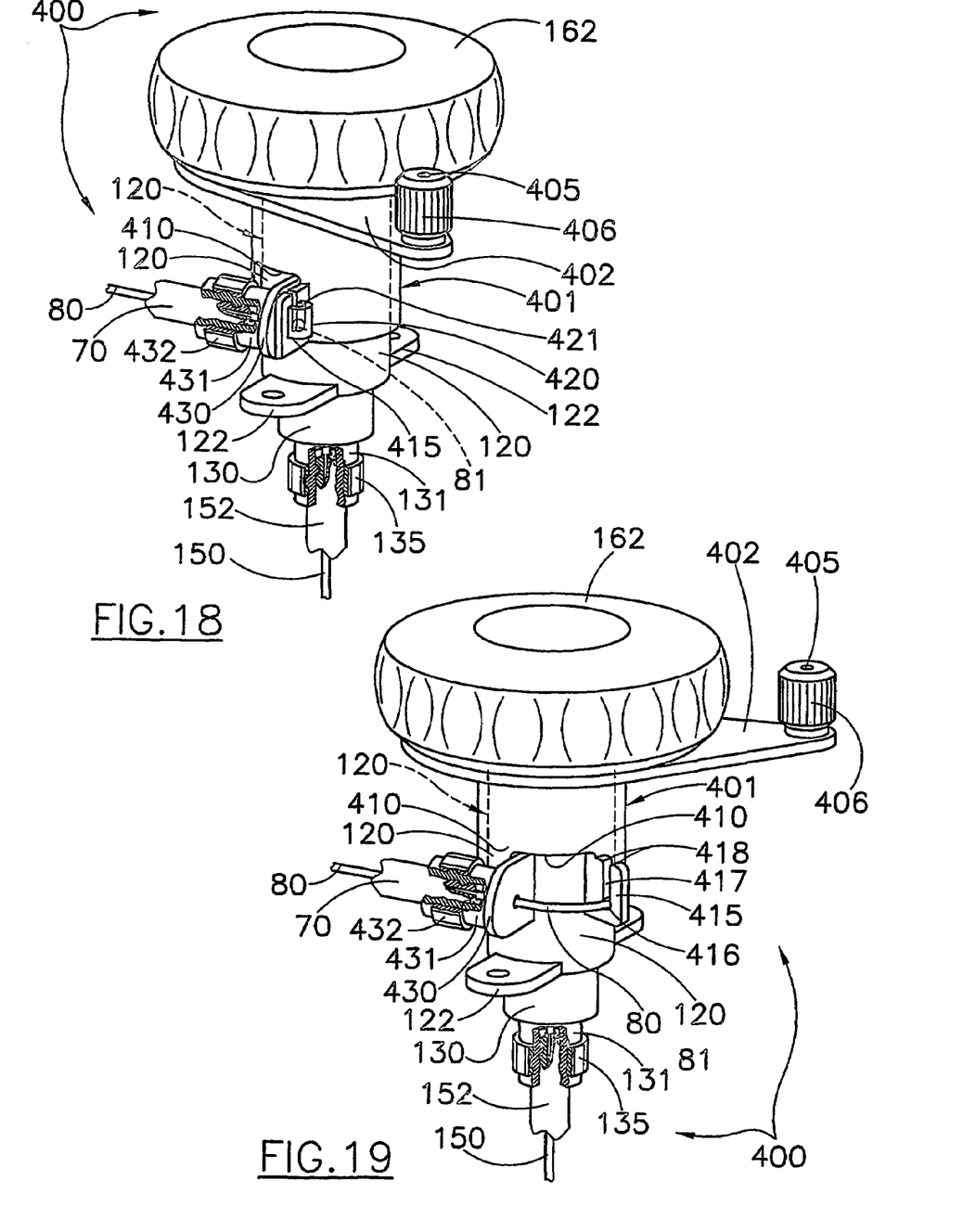

FIGS. 18 and 19 illustrate a multiple device 400 for double control. In the first case control is exerted by knob 162 which, by means of the grooved sleeve 120 and sheath holder 131, enables the push-pull cable 150 to be moved freely in both directions inside the sheath 152. In the second case control is exerted by a rotating sleeve 401 that freely surrounds the grooved sleeve 120 and extends for a short distance beyond the anchoring tabs 122.

At the top, matching with the knob 162, said sleeve 401 presents a control lever 402 with a triangular end whose vertex carries an orthogonal pin 405 round which the cylindrical vertically knurled finger knob 406 freely rotates.

Close to the end of the sleeve 401, on the longitudinal lateral edge of a longitudinal rectangular window 410, said sleeve presents a longitudinal tab 415 to support the push-pull cable 80 with head 81.

In said tab is a hole 416 for the push-pull cable 80 at the bottom of a slit 417 in which said cable can be pressed down, entry being facilitated by the bevelled opening 418.

Once so inserted, the head 81 of the push-pull cable 80 is held in the casing 420 with upper hole 421, at the back of the tab 415.

Said window 410 admits the bracket 430 longitudinally fixed to the end of the grooved sleeve 120 to which bracket is fixed the sheath holder 431 with safety ring 432.

Figure 20:
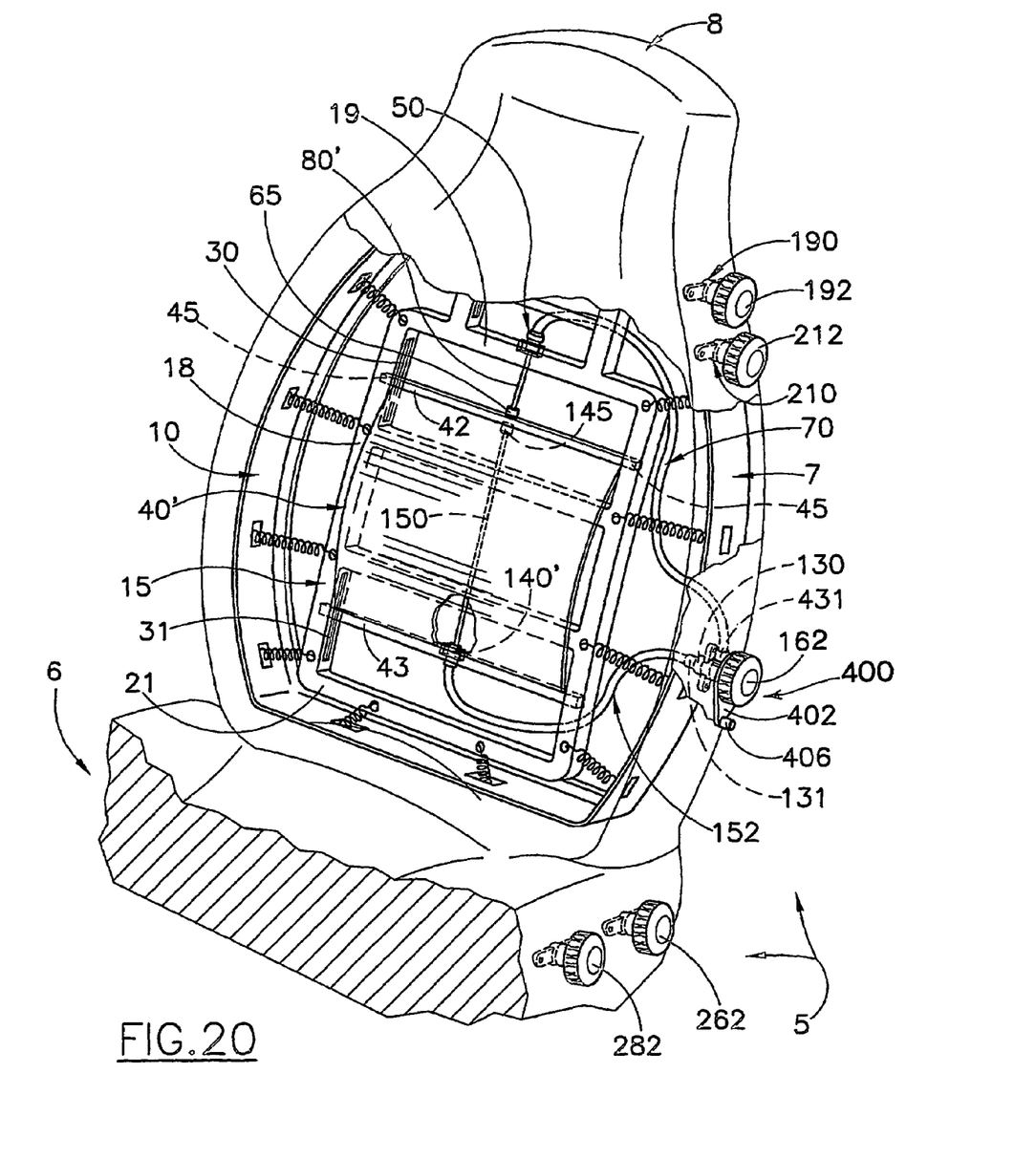

The foregoing explains how said multiple control device 400 makes possible double control as a substitute, shown by the example in FIG. 20, for the two controls 90 and 160 illustrated in FIG. 6.

The sheath 152 remains held in place by the sheath holder 131 for guiding the push-pull cable 150, while the sheath 70 is inserted in the sheath holder 431 fixed to the bracket 430 at the end of the grooved sleeve 120 (FIG. 19).

It follows that, turning the knob 162 adjusts convexity of cushioned plate 40 in the back 7, and using the finger knob 406, the lever 402 can be rotated to adjust the position of said cushioned plate 40.

The invention claimed is:

1. A structure for anatomical support in a back, headrest and seat components of seating, comprising a frame; a convex cushioned plate provided with means that slide in relation to said frame; a push-pull cable having first and second ends with said first end fixed to an end of said cushion plate; a sheath in which said cable freely slides and which has first and second ends with said first end of said sheath fixed to said frame and to one end of said cushioned plate; a control device to which said second end of said push-pull cable and of said sheath is fixed, said control device being configured to determine, by moving said push-pull cable in one direction and in another direction, adjustment of a position of said cushioned plate of said frame, or adjustment of convexity of said cushion plate if said first end of said sheath is fixed to said plate, wherein the movement of said push-pull cable in both directions inside said sheath is obtained by a cylindrical slider sliding in a tubular body which is rotatable by said control device to cause the movement of said push-pull cable in said directions.

2. A structure as defined in claim 1, wherein said ends of said sheath are respectively fixed to said cushioned plate, to said frame and to said control device by an anchoring device comprising the tubular body with a partial elastic end into which the end of said sheath is pressed and a safety ring transferable to an area of said tubular body into which said end of said sheath is pressed to hold it stable.

3. A structure for anatomical support in a back, headrest and seat components of seating, comprising a frame; a convex cushioned plate provided with means that slide in relation to said frame; a push-pull cable having first and second ends with said first end fixed to an end of said cushion plate; a sheath in which said cable freely slides and which has first and second ends with said first end of said sheath fixed to said frame and to one end of said cushioned plate; a control device to which said second end of said push-pull cable and of said sheath is fixed, said control device being configured to determine, by moving said push-pull cable in one direction and in another direction, adjustment of a position of said cushioned plate of said frame, or adjustment of convexity of said cushion plate if said first end of said sheath is fixed to said plate, wherein a movement of said push-pull cable in both directions inside said sheath is obtained by a cylindrical slider having two diametral arms and a means for anchoring the end of said push-pull cable freely sliding within a tubular body having two longitudinal slits in which said diametral arms are freely slidable, said tubular body being fitted inside a sleeve with internal helical grooves of a size sufficient to allow ends of said diametral arms emerging from said sleeves to slide freely, with a device for anchoring said sheath in a bottom of a grooved sleeve, wherein the end of said push-pull cable emerging from said sheath is fixed to said slider, on causing said tubular body to rotate by said control device, wherein said slider with said arms is guided by said longitudinal slits in said tubular body and said helical grooves in said sleeve and translates in rotation to said sheath in one direction or another direction according to a direction of rotation of said tubular body, so as to adjust a position or convexity of said cushioned plate in relation to said frame.

4. A structure as defined in claim 3, wherein on concluding rotation of said tubular body, the ends of said slider arms enter said helical grooves at two ends of said longitudinal sleeve, so that stabilizing adjustment of the position or convexity of said cushioned plate is determined by the rotation of said tubular body.

5. A structure as defined in claim 3, wherein control device has a knob configured so that the rotation of said tubular body is carried out manually by said knob.

6. A structure as defined in claim 3, wherein said control device has an electric ratiomotor connected to a switch respectively on a side of said back, said headrest and said sheath to provide the rotation of said tubular body.

7. A structure as defined in claim 1, wherein said control device has two control units provided at sides of said back, said headrest and said seat for respectively adjusting a position or convexity of said cushioned plate in each of said back, said headrest and said sheath.

8. A structure as defined in claim 1, wherein said first end of said sheath is fixed to one end of said frame while said first end of said pull-push cable is fixed to one end of said cushioned plate, so that using said control device to which said second ends of said push-pull cable and of said sheath are fixed, said push-pull cable translates in relation to said sheath and a position of said cushioned plate is adjustable in relation to said frame.

9. A structure for anatomical support in a back, headrest and seat components of seating, comprising a frame; a convex cushioned plate provided with means that slide in relation to said frame; a push-pull cable having first and second ends with said first end fixed to an end of said cushion plate; a sheath in which said cable freely slides and which has first and second ends with said first end of said sheath fixed to said frame and to one end of said cushioned plate; a control device to which said second end of said push-pull cable and of said sheath is fixed, said control device being configured to determine, by moving said push-pull cable in one direction and in another direction, adjustment of a position of said cushioned plate of said frame, or adjustment of convexity of said cushion plate if said first end of said sheath is fixed to said plate, wherein said frame and said cushion plate are formed of one piece with one another via a hinge formed of a same material but thinner to allow said cushioned plate to be folded back on said frame, and wherein at an end of said frame opposite to said hinge two lateral slots are provided in which short rods at a free end of said cushioned plate are inserted and freely slide.

10. A structure as defined in claim 1, wherein said first end of said sheath is fixed to said frame by; while said first end of said push-pull cable is fixed to a free end of said cushioned plate, so that convexity of said cushioned plate is adjustable when said control device, to which said second ends of said push-pull cable and of said sheath are fixed, causes translation of said push-pull cable in relation to said sheath.

11. A structure for anatomical support in a back, headrest and seat components of seating, comprising a frame; a convex cushioned plate provided with means that slide in relation to said frame; a push-pull cable having first and second ends with said first end fixed to an end of said cushion plate; a sheath in which said cable freely slides and which has first and second ends with said first end of said sheath fixed to said frame and to one end of said cushioned plate, a control device to which said second end of said push-pull cable and of said sheath is fixed, said control device being configured to determine, by moving said push-pull cable in one direction and in another direction, adjustment of a position of said cushioned plate of said frame, or adjustment of convexity of said cushion plate if said first end of said sheath is fixed to said plate, wherein a device for multiple manual control is provided and comprises insertion around a grooved sleeve that supports a knob, of a rotating sleeve to which is fixed a triangular lever, a vertex of which projects suitably outwards from said knob, on which end is a finger knob, being fixed to a longitudinal bracket, fixed to said grooved sleeve, a device for anchoring a sheath, a second longitudinal bracket provided on a rotating sleeve and to which is fixed a head of one end of said push-pull cable sliding inside said sheath, rotation of said knob thus causing movements in both directions of said push-pull cable inside a sheath inserted in said anchoring device mounted on a tubular body at an end of said grooved sleeve, and by using said finger knob to move said triangular lever, determine movement in both directions of said push-pull cable sliding inside said sheath inserted in said anchoring device fixed to said bracket on said grooved sleeve, so that with said multiple manual control a position of said cushioned plate is adjustable in relation to said frame by using said finger knob, and its convexity is adjustable by using said knob.

12. A structure as defined in claim 1, further comprising helical springs which join said frame to a fixed structure of the seat.

13. A structure as defined in claim 1, wherein said back and said seat each have a fixed structure including a metal band placed crosswise and shaped so as to substantially embrace a perimeter of said back and said seat.

14. A structure for anatomical support in a back, headrest and seat components of seating, comprising a frame; a convex cushioned plate provided with means that slide in relation to said frame; a push-pull cable having first and second ends with said first end fixed to an end of said cushion plate; a sheath in which said cable freely slides and which has first and second ends with said first end of said sheath fixed to said frame and to one end of said cushioned plate; a control device to which said second end of said push-pull cable and of said sheath is fixed, said control device being configured to determine, by moving said push-pull cable in one direction and in another direction, adjustment of a position of said cushioned plate of said frame, or adjustment of convexity of said cushion plate if said first end of said sheath is fixed to said plate, wherein said control device has an electric ratiomotor for an electric motor and connected to a switch respectively on a side of said back, said headrest and said sheath to provide rotation of said tubular body, wherein said ratiomotor for said electric motor is epicycloidal.

* * * * *